June 14, 1938. B. BAKER 2,120,726

REVOLVING ROAD MAP AND CARD HOLDER

Filed April 20, 1937 2 Sheets-Sheet 1

INVENTOR:
Blake Baker,
BY:
Christian R. Nielsen
ATTORNEY

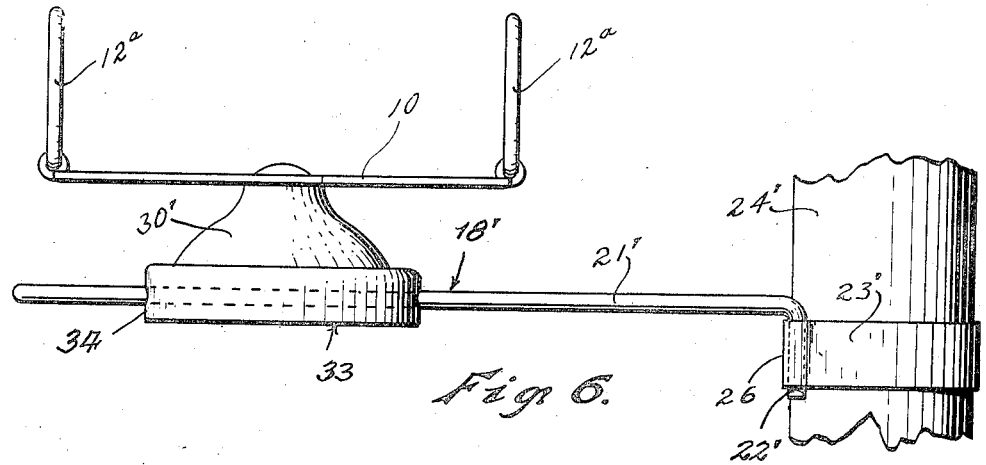
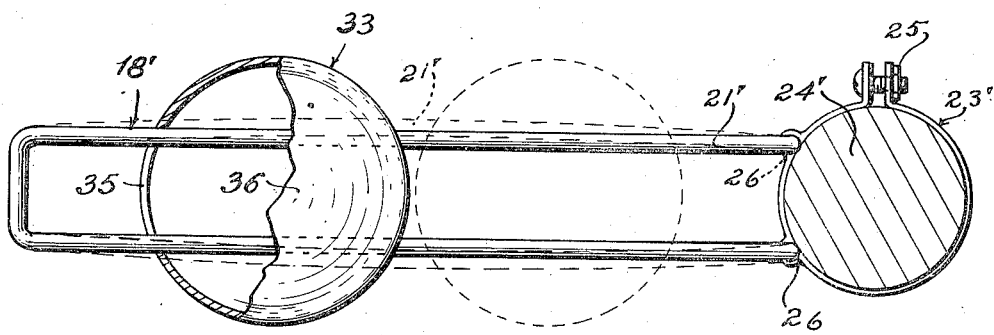
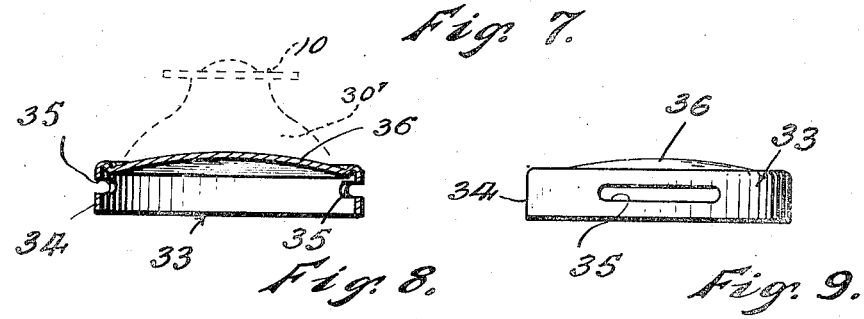

Patented June 14, 1938

2,120,726

UNITED STATES PATENT OFFICE 2,120,726

REVOLVING ROAD MAP AND CARD HOLDER

Blake Baker, St. Petersburg, Fla., assignor to Edward Stonehill, St. Petersburg, Fla.

Application April 20, 1937, Serial No. 138,021

4 Claims. (Cl. 40—86)

My invention relates to a combined road map and card holder, and it consists in the constructions, arrangements and combinations herein described and claimed.

It is an object of the invention to provide a map holder wherein the map will be supported in a manner permitting movement of the map in the direction being travelled so that the route may be readily followed.

It is a further object of the invention to provide a novel construction of "take-up" means for the map.

It is a still further object of the invention to provide novel means for attachment of a map holding device.

A still further object of the invention is the provision of a map or card holding device which is cheap of construction, readily installed and manipulated.

Additional objects, advantages and features of invention will be apparent from the following description considered in conjunction with the accompanying drawings, wherein Figure 1 is a top plan view of my holder applied to a steering column of a motor vehicle.

Figure 5 is a plan view illustrating a mode of supporting a card or the like.

Figure 6 is a side elevation of a modified form of the device embodying a suction cup.

Figure 7 is a top plan view thereof.

Figure 8 is a sectional view of the support cap.

Figure 9 is a side elevation thereof.

Figure 1:
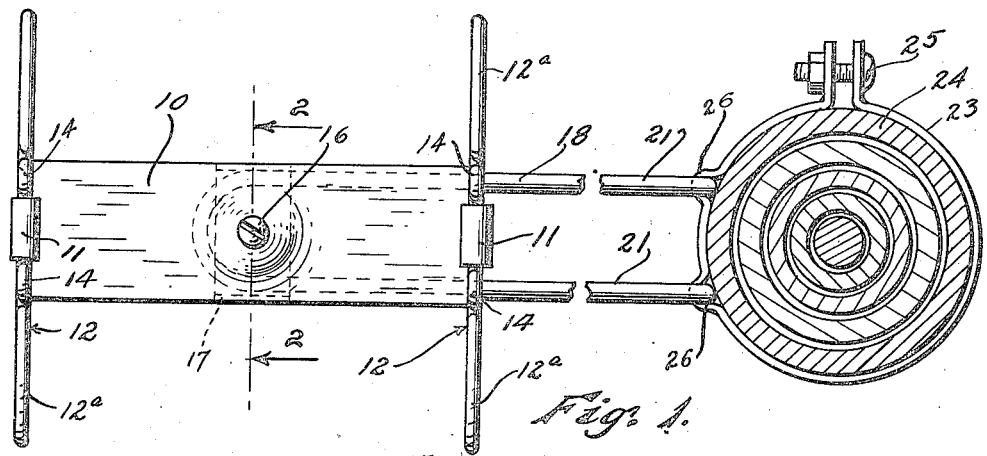
Figure 2:
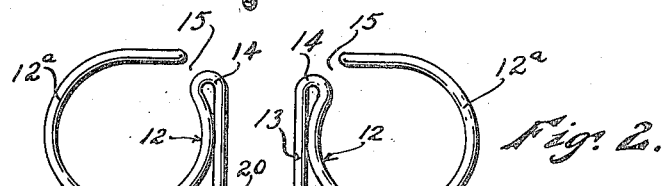
Figure 2 is a cross section on the line 2—2 of Figure 1.

The present invention is directed particularly to the display of a map to be followed by a motorist, and in carrying out the invention provision is made of a body plate 10 preferably of rectangular formation, upon the ends of which an ear 11 is formed. The ears 11 are formed as integral parts of the plate 10 and shaped to provide a bearing for respective map supporting members 12. The supporting members 12 are identical in construction, and are formed from a single strand of wire, as will now be described. The wire is bent intermediate its length to form a U-shaped portion 13, the bight portion of which is pivotally mounted in an ear 11, as may be clearly seen in Figure 2. Respective end portions of the wire are then bent in clockwise and counter-clockwise directions, respectively, to define the circular clip members 12a, the terminations of the wires stopping short and lying slightly above the bend 14 of the clips, thus forming an entrance opening 15 to each clip 12a. With the supporting members 12 secured to the plate, it will be apparent that the clips 12a positioned at respective ends of the plate 10 will be aligned, and the axis of the clips lie in a plane parallel with but outwardly of the longitudinal edges of the plate.

The plate 10 has an aperture formed medially thereof receiving a screw 16, and upon the underside of the plate, a clamp plate 17 is positioned apertured to receive the screw 16, and between the main plate 10 and the clamp plate 17, a support member 18 is secured, by tightening of the nut 19 upon the screw 16. The plate 10 at points surrounding the opening for the screw 16 may be slightly dished as at 20, to provide a resilient clamping action of the support member 18, and obviously, this area may be corrugated for lending greater stability to the plate. It will be obvious that the holder may be rotated about the bolt 16 for placement of the map, and it will also be apparent that the holder may be adjusted longitudinally of the support member 18.

Figure 3:
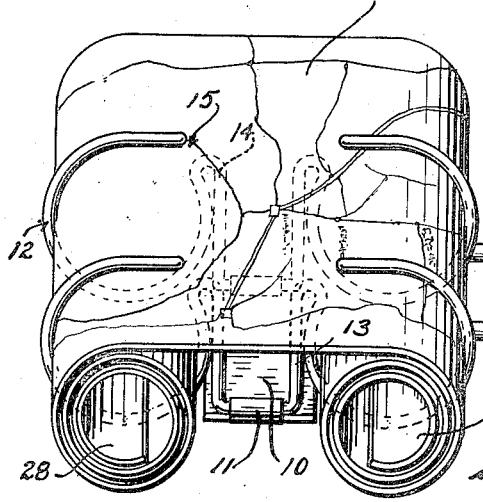
Figure 3 is a perspective view of my holder having a map associated therewith.

The member 18, in the present instance, is formed from a suitable gauge wire bent intermediate its length to provide two parallel leg portions 21, the terminations of which are bent downwardly at right angles (see Fig. 3) to form anchorage studs 22.

A mounting ring 23 is provided of a size to fit the steering post 24 of a motor vehicle, and in the present instance, consists of a split ring, the ends of which are bent to define opposed ears, the latter being apertured to receive a clamp screw 25, by means of which, the ring may be secured to the post. At points spaced so as to receive the studs 22 of the support member, a pair of outwardly bent semi-circular sockets 26 are formed in the ring, the radius of these sockets being slightly less than the diameter of the studs 22, and it will thus be apparent that with the studs 22 disposed within the sockets, tightening of the screw 25 will draw the studs into snug contacting relation with the post 24, thus holding the assembly secure.

In use, the map to be displayed is rolled at each end toward the center (see Fig. 3) the end 27 being wound in a clockwise direction while the end 28 is rolled in a counter-clockwise direction. The clips 12 being swung to a vertical position upon the plate 10, so as to align the clips 12a at respective ends, the rolled ends 27—28 are slid endwise through the clips 12a at respective sides of the holder, the map portion 29, which is to be displayed having been admitted through the entrance opening 15 of the clips, being supported at the bent portions 14 of respective clips. The map will thus be supported revolubly within the clips 12a and when it is desired to move the map to bring into view a further route on the map, the index finger of the motorist is inserted into one of the rolled ends to engage the end of the map and by turning the finger, the map will be caused to be further rolled, which will obviously cause unrolling of the other rolled end, thus displaying a further portion of the map.

Figure 4:
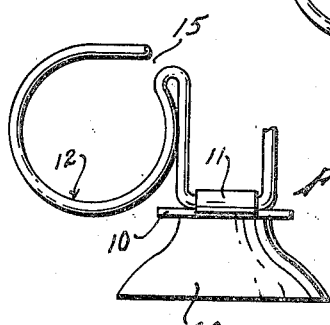
Figure 4 is a modified form of support for the map holder.

In Figure 4, I have illustrated support of the map holder, by means of a suction cup 30, permitting the holder to be affixed to a smooth surface such as the instrument board or the windshield of the vehicle, or any other flat surface.

Figure 5:
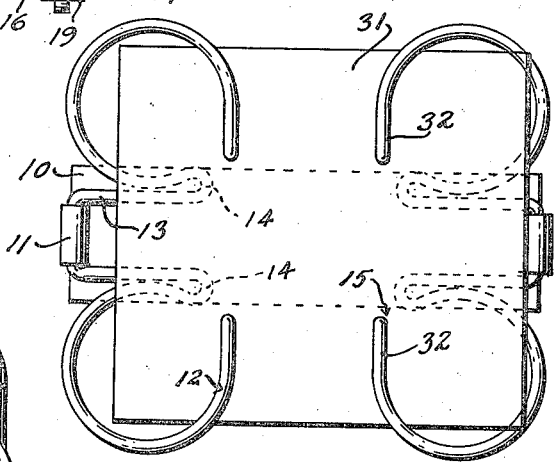

In Figure 5, the holder is shown as a support for a registration or similar card, and in this use, the clip members 12 are swung so as to position the U-shaped portions 13 parallel to and above the plate 10. The card 31 is then inserted through the entrance openings 15 of the clips until properly centered, thereby retaining the card, by virtue of the overlying end portions 32 of the clips. It is not necessary that all the clips be employed in retention of the card, as any two will be ample and various positioning of the cards within the clips may be followed.

In Figures 6 to 9, I have illustrated a modified form of support, embodying the suction cup, and in this instance, the support 18' is identical to that previously described and comprises the legs 21', studs 22' secured to the steering post 24' by the mounting ring 23'.

A mounting cap 33 is provided slidably mounted upon the legs 21' and as shown in Figure 8, has a circumscribing annular flange 34 slotted at diametrically opposite sides as at 35 and through which the legs 21' extend. The length of the slots 35 are slightly less than the normal bowed relation of the legs 21' so that when the legs are positioned through the slots, it will be necessary to compress the legs slightly to admit them through the slots. Release of the legs will permit the legs to assume their normal bowed relation, firmly gripping the cap at the ends of the slots.

The cap 33 includes a convex top 36 of a diameter to receive a suction cup 30', the latter having fixed thereto the body plate 10 and clip members 12a, as previously desired. Obviously, with the sliding plate mounted upon the bracket and secured to the column 24', the map or card holder may be secured to the plate 36 by the suction cup, or it may be detached from the plate and the suction cup and its holder then attached to any flat, smooth surface.

It should be noted that in all forms of the device, the map or card holder is slidable adjustable upon the legs 21—21', permitting movement of the holder to a position inwardly or outwardly of the steering post.

While I have shown and described preferred forms of the device, this is by way of illustration only, and I consider as my own, all such modifications in structure as fairly fall within the scope of the appended claims.

I claim:—

1. A map holder comprising a base plate having means for attachment to a supporting member, ears on the plate at the ends thereof, a map-support member swingably mounted in each ear, said map-support members consisting of a wire bent intermediate its length defining a bight portion forming the trunnion for pivotal mounting in the ears, the ends of the wire being bent upon themselves and formed into open loop members positioned upon opposite sides of the base plate, the loops upon respective sides of the plate being aligned, and a map extended across the plate, the ends thereof being rolled within respective aligned loop members.

2. A map holder comprising a base plate having an aperture medially thereof, a bolt therein, a clamp plate on the bolt, a support member consisting of a pair of parallel leg members, said leg members being positioned between the base plate and the clamp plate, and projecting beyond the base plate, the leg members terminating in right angularly disposed studs, a clamp collar, said collar having sockets for accommodation of the studs, paired aligned open loop members on respective longitudinal edges of the base plate, and a map extended across the base plate, respective ends thereof being rolled within respective aligned loop members.

3. A card holder comprising a base plate having means for attachment to a support member, ear members on respective ends of the base plate, a retainer member swingably mounted in each ear, said retainer member comprising open loops, the opening thereof being presented toward the longitudinal edges of the base plate when the retainer member is swung to overlie the base plate.

4. In a map or card holder, a pair of parallel rods, means for securing the rods to a support member, a cap member, said cap member having an annular circumscribing flange, diametrically disposed slots in the flange receiving the rods therethrough said rods having frictional binding action upon respective ends of the slots, said cap member having a convex top portion for reception of a suction cup and said suction cup having means for support of a map or card.

BLAKE BAKER.